Patented Feb. 9, 1943

2,310,731

UNITED STATES PATENT OFFICE 2,310,731

INTERPOLYMERS OF DIALLYL ITACONATE AND ETHYL METHACRYLATE

Gaetano F. D'Alelio, Pittsfield, Mass., assignor to General Electric Company, a corporation of New York No Drawing. Application October 31, 1939, Serial No. 302,169

4 Claims. (Cl. 260—78)

This invention relates to the production of new materials having valuable and characteristic properties that make them especially suitable for use in industry, for example in molding, laminating, casting, coating and adhesive applications and for other purposes. The invention is concerned more particularly with compositions of matter comprising an interpolymer (copolymer) or interpolymers of at least one itaconic ester of an unsaturated alcohol and at least one other polymerizable compound containing the structure or grouping

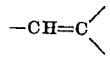

more particularly a

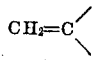

grouping. Specifically the invention is concerned with interpolymers of diallyl itaconate and ethyl methacrylate.

This application is a continuation-in-part of my copending applications Serial No. 294,493, now Patent No. 2,279,881, Serial No. 294,494, now Patent No. 2,279,882, Serial No. 294,495, now Patent No. 2,279,883, Serial No. 294,496, now Patent No. 2,279,884, Serial No. 294,497, now Patent No. 2,279,885, and Serial No. 294,498, all of which applications were filed September 12, 1939, and are assigned to the same assignee as the present invention. Serial No. 294,493 is directed to propyl and butyl itaconates and to interpolymers produced from the same; Serial No. 294,494, to itaconic esters of derivatives of a polyhydric alcohol, which derivatives contain a single unsubstituted hydroxyl group, and to interpolymers produced from the said esters; Serial No. 294,495, to itaconic esters containing at least six carbon atoms in the individual ester group, and to interpolymers produced from such esters; Serial No. 294,496, to carbocyclic itaconic esters and to interpolymers prepared from the same; Serial No. 294,497, to optically inactive amyl itaconates and to interpolymers produced therefrom; and Serial No. 294,498, to interpolymers resulting from the polymerization of a mixture including dimethyl itaconate and ethyl methacrylate, with or without other polymerizable organic compounds containing

group. In each of these cases I disclosed but did not claim the itaconic esters of unsaturated alcohols, specifically diallyl itaconate. The present application differs from the above-identified copending applications in that it is directed specifically to the itaconic esters of the unsaturated alcohols and to interpolymers produced from such esters.

The esters used in practicing this invention specifically may be defined as itaconic esters in which at least one ester group contains an unsaturated hydrocarbon radical, more particularly an ethylenic or acetylenic hydrocarbon radical. Examples of such esters are monoallyl itaconate,

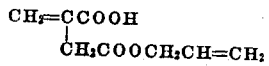

isopropyl allyl itaconate,

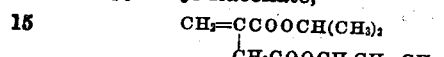

and allyl methallyl itaconate,

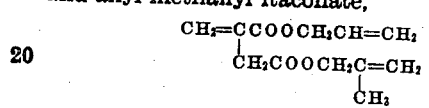

It will be noted that the two last-named esters are mixed esters in which at least one ester group contains an ethylenic hydrocarbon radical. The preparation of mixed esters is in general somewhat complicated, involving extensive processing and high cost. The mono esters are not difficult to make but no particular advantages ordinarily accrue from their use in the production of interpolymers. Hence the preferred embodiment of this invention comprises the preparation, and utilization in the production of interpolymers, of unsaturated diesters of itaconic acid in which both ester groups are identical (symmetrical diesters). Illustrative of such esters are diallyl, dimethallyl, dicrotyl (also known as di-(3-methylallyl)), dipropargyl, di-(2-chlorallyl), dicinnamyl, di-(1-chlorallyl), dimethvinyl, divinyl, di - (diphenyl allyl), di - (1 - phenyl - 2-propyn-1-yl), di-(3-methyl-4-nonyn-3-yl), di-(4-methyl-5-decyn-4-yl), di - (4 - methyl-5-undecyn-4-yl), etc., esters of itaconic acid. The mixed and symmetrical itaconic diesters with which this invention is especially concerned may be graphically expressed by the formula

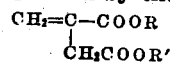

where R and R' are the same or different ethylenic or acetylenic radicals, but preferably are the same.

In contrast to the previously known polymeric methyl, ethyl and optically active amyl itaconic esters, the polymerized esters of this invention are either insoluble masses, infusible masses or both insoluble and infusible. For example, the polymerization of diallyl itaconate gives clear, glass-like, water-white, insoluble, infusible masses. This is due probably to the presence of three polymerizable double bonds, one double bond inherent in the itaconyl radical, and the remainder in the unsaturated hydrocarbon radicals of the ester groupings. I have discovered that these characteristics can be utilized to marked economic advantage in the production of new and useful interpolymers. By practicing this invention, polymeric organic masses which initially lack adequate resistance to heat and solvents surprisingly acquire such resistance by copolymerizing one or more of these new itaconic esters with such masses in monomeric or partially polymerized state.

As illustrative of the difference resulting from interpolymerizing the itaconic esters of this invention with other polymerizable materials, the following is mentioned: Vinyl acetate, when polymerized alone for 18 hours at 70° C. with 0.25% by weight benzoyl peroxide, gave a soft, thermoplastic resin but, when a mixture of 10 parts diallyl itaconate and 90 parts vinyl acetate was polymerized under the same conditions, an insoluble, infusible copolymer was obtained.

Various methods may be used to prepare the esters with which this invention is concerned. For example, they may be prepared by ester exchange reactions in the presence of a suitable inhibiting agent, such as phenolic bodies, and a suitable catalyst, the reaction proceeding as in an alcoholysis. Thus, in the preparation of, for instance, diallyl itaconate, the reactants may comprise allyl alcohol and dimethyl or diethyl itaconate, hydroquinone as an inhibiting agent and a catalyst such as metallic sodium, potassium carbonate, sulfuric acid, copper bronze, etc. The esters of this invention also may be prepared from itaconic nitrile by causing to react therewith an alcohol, corresponding to the ester desired, in the presence of water and an inorganic acid. Or, they may be made from itaconyl chloride and a selected alcohol, or by decomposition of a corresponding ester of citric or citraconic acids or one of their derivatives.

A preferred method of preparation is by direct esterification of itaconic acid with the selected alcohol in the presence of an esterification catalyst, with or without the presence of other unreactive bodies to remove the water resulting from esterification. This method may be carried out continuously.

The mixed esters of this invention, that is, itaconic esters in which the ester groups are different, also may be prepared in various ways. Illustrative of such esters are methyl allyl itaconate, ethyl methallyl itaconate, propyl crotyl itaconate and butyl cinnamyl itaconate. These mixed esters may be prepared, for instance, by effecting reaction between itaconic monoester acid chloride and a selected alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate, and an alcohol corresponding to the ester desired.

Another method of preparation of these mixed esters is from itaconic monoacid chloride and a selected alcohol, followed by direct esterification of the other acid radical by another alcohol. These mixed esters also may be made by direct consecutive esterification of each of the carboxyl groups with different alcohols, or by treating itaconic diacid chloride first with one alcohol, then with another. They also may be prepared by saponification of one group of an itaconic diester with alcoholic potassium hydroxide in the cold and either isolating the monoacid from the potassium salt for further reaction with the selected alcohol or causing the potassium salt to react directly with an alkyl sulfate corresponding to the ester desired.

In carrying the present invention into effect the normal and isomeric forms of the above-described unsaturated esters of itaconic acid may be polymerized separately, or mixed with each other, or mixed with other polymerizable material. Heat, light, or heat and light may be used to effect polymerization, although under such conditions the rate of polymerization is relatively slow. Hence, to accelerate the polymerization I prefer to use a catalyst accompanied by heat, light, or heat and light. Examples of catalysts which may be used are ozone, ozonides, hydrogen peroxide, organic and inorganic acids such as methacrylic acid, hydrofluoric acid, sulfuric acid, etc., aluminum chloride, boron fluoride, superoxides such as inorganic peroxides, e. g., barium peroxide, sodium peroxide, etc., aliphatic acyl peroxides, e. g., acetyl peroxide, stearyl peroxide, lauryl peroxide, etc., peroxides of the aromatic acid series, e. g., benzoyl peroxide, various percompounds such as perborates, persulfates, perchlorates, etc., metal compounds of the unsaturated acids as, for instance, cobalt and manganese resinates, linoleates, maleates, etc. Benzoyl peroxide is the preferred catalyst because of its ease of handling, its relative freedom from explosive hazards and its ready solubility in the monomeric or partially polymerized itaconic esters. The rate of polymerization is a function of the temperature, and may be carried out at from room temperature (20°–30° C.) to temperatures materially above 100° C., for example about 130° C. Any suitable amount of catalyst may be used, but in general the catalyst concentration will be within the range of 0.1 to 2.0 percent by weight of the whole.

The monomeric itaconic esters of this invention in most cases give hard bodies when polymerized alone. In many cases, such as with allyl or methallyl itaconate, the polymeric forms are insoluble, infusible bodies. However, generally it may be said that the softening point, solubility and other properties of these itaconic esters depend upon the number of carbon atoms in, and the structure of, the ester chain. In general, the longer the ester chain, the lower is the softening point of the polymer. Some of the completely polymerized esters are clear, colorless, brittle solids somewhat resembling brittle glasses. Others are hard, clear, insoluble, infusible masses. Some possess properties intermediate brittle solids and relatively insoluble, pliable, rubbery masses.

In many applications the intermediate normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to produce products of different softening points and degrees of solubility, this may be done by copolymerizing a selected monomeric or partially polymerized ester of this invention with at least one other monmeric or partially polymerized itaconic ester or with other monomeric or partially polymerized compound or compounds containing the structure

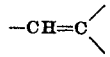

specifically the grouping

Thus, copolymers of valuable properties may be obtained by copolymerizing, for example, diallyl or dimethallyl itaconate with other monomeric or partly polymerized itaconic esters, for example dimethyl itaconate, diethyl itaconate, etc., vinyl and allyl esters of saturated and unsaturated mono- and poly-carboxylic acids, etc., more particularly with polymerizable materials containing a

grouping, for instance polymerizable materials containing a vinyl or a vinylidine grouping such as monomeric or partly polymerized styrene, vinyl esters such as the acetate, proprionate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, ethyl methacrylate, propyl methacrylate, butyl methacrylate, etc. Illustrative examples of other compounds having a

grouping and which may be used in carrying the present invention into effect are given in my copending application Serial No. 302,167, filed October 31, 1939, and assigned to the same assignee as the present invention.

In order that those skilled in the art better may understand how the present invention may be carried into effect, the following illustrative examples are given of the preparation of these new esters and of various compositions comprising the same. All parts are by weight.

EXAMPLE 1

*Diallyl itaconate*

130 parts of itaconic acid, 174 parts allyl alcohol, 200 parts benzene and 5 parts concentrated sulfuric acid were subjected to reaction in a continuous esterification apparatus until no more water of reaction was collected. When cool, the mixture was washed with dilute sodium carbonate until neutral, then dried over anhydrous sodium carbonate. The benzene and excess allyl alcohol were removed by distillation under vacuum and 146 parts diallyl itaconate, boiling at 135°–139° C. at 14 mm. pressure, were obtained. When this ester was treated with 1% benzoyl peroxide at 70° C. for ½ to 1½ hours, a clear, colorless, insoluble, infusible product was obtained.

EXAMPLE 2

| | Parts |
|---|---|
| Diallyl itaconate | 50 |
| Isobutyl methacrylate | 50 | were mixed and treated with 1% benzoyl peroxide at 70° C. for 24 hours, resulting in a hard, clear, tough, colorless, heat- and solvent-resistant copolymerization product. Copolymers having similiar properties were obtained when, for example, ethyl acrylate, propyl methacrylate, methyl acrylate, methacrylic nitrile, ethyl methacrylate, N-butyl methacrylate, glycol dimethacrylate, diallyl maleate, triallyl tri-carballylate, diallyl alpha allyl malonate, tri-allyl tartrate, diallyl oxalate, diallyl adipate, diallyl glutarate, triallyl citrate, diallyl malonate, diallyl azelaate, or vinyl acetate were used in place of the isobutyl methacrylate in the above formulation.

EXAMPLE 3

| | Parts |
|---|---|
| Diallyl itaconate | 33⅓ |
| Ethyl acrylate | 33⅓ |
| Vinyl acetate | 33⅓ | were mixed and treated with 1% benzoyl peroxide at 70° C. for 24 hours to give a hard, clear, colorless, heat- and solvent-resistant copolymerization product. Copolymers with similar properties were obtained when the ethyl acrylate and vinyl acetate in the above formulation were replaced by other mixtures, for example diallyl maleate and vinyl acetate, diallyl maleate and ethyl acrylate, diallyl maleate and glycol dimethacrylate, diallyl maleate and methallyl methacrylate, methyl methacrylate and vinyl acetate, methyl methacrylate and ethyl acrylate, or ethyl acrylate and vinyl acetate. The introduction of styrene as a member of the three-component system usually results in a firm, transparent, gellike copolymerization product as is evidenced when diallyl itaconate, methyl methacrylate and styrene, or diallyl itaconate, ethyl acrylate and styrene, or diallyl itaconate, vinyl acetate and styrene, are copolymerized under similar conditions.

Ratios other than those specified above were likewise used to obtain copolymers of desired heat-resistance, solvent-resistance or heat- and solvent-resistance, as for example:

17 parts diallyl itaconate, 33 parts N-butyl methacrylate, 50 parts styrene 33 parts diallyl itaconate, 17 parts propyl methacrylate, 50 parts vinyl acetate 37 parts diallyl itaconate, 43 parts vinyl acetate, 20 parts methyl acrylate 37 parts daillyl itaconate, 37 parts vinyl acetate, 26 parts methyl acrylate 37 parts diallyl itaconate, 37 parts methyl methacrylate, 26 parts ethyl acrylate 30 parts diallyl itaconate, 30 parts ethyl acrylate, 40 parts styrene 25 parts diallyl itaconate, 25 parts diallyl maleate, 50 parts vinyl acetate 10 parts diallyl itaconate, 10 parts diethyl itaconate, 5 parts diallyl oxalate 10 parts diallyl itaconate, 15 parts styrene, 5 parts diallyl oxalate 10 parts diallyl itaconate, 10 parts diallyl oxalate, 5 parts vinyl acetate 10 parts diallyl itaconate, 10 parts methyl methacrylate, 7 parts diallyl oxalate 15 parts diallyl itaconate, 5 parts ethyl acrylate, 5 parts diallyl oxalate 10 parts diallyl itaconate, 15 parts styrene, 5 parts diallyl oxalate 0.3 part diallyl itaconate, 20 parts dimethyl itaconate, 80 parts ethyl methacrylate

Example 4

| | Parts vinyl acetate plus parts diallyl itaconate | |
|---|---|---|
| (a) | 80.0 | 20.0 |
| (b) | 90.0 | 10.0 |
| (c) | 95.0 | 5.0 |
| (d) | 99.9 | 0.1 |
| (e) | 99.975 | 0.025 |

The above two-component mixtures of monomers were treated with from 0.25% to 0.5% benzoyl peroxide for 18 hours. Mixtures a, b and c resulted in hard, clear, colorless, heat-resistant copolymers. The copolymer obtained from d was considerably harder than polyvinyl acetate obtained under similar conditions. This copolymer was practically unaffected by the solvents specific for polyvinyl acetate. The copolymer obtained from e was only swollen by the specific solvents for polyvinyl acetate.

Example 5

| | Parts |
|---|---|
| Diallyl itaconate | 0.5 |
| Ethyl methacrylate | 99.5 | were mixed with 0.25 part benzoyl peroxide and heated at 55° C. for 27 hours, followed by heating at 85° C. for 24 hours to give a hard, clear, water-white copolymer adapted to molding processes involving compression. Not only were the flexural and impact strengths of polymeric ethyl methacrylate improved by this copolymerization process, but the surface hardness and resistance to solvents were exceptionally high. When higher concentrations of diallyl itaconate, for example 20% by weight, are used, the resulting copolymers are exceptionally resistant to heat and solvents and have high impact strength and surface hardness. Such copolymers are especially suitable for the manufacture of optical lenses, window panes, etc. All the other monomeric alkyl methacrylates containing less than seven carbon atoms in the alkyl radical are likewise particularly suited for copolymerization with diallyl itaconate to yield mechanically strong, heat-, solvent- and abrasion-resistant organic glasses.

Example 6

That the physical nature of the resultant interpolymer cannot be predicted is evidenced by the copolymer obtained when 50 parts diallyl itaconate and 50 parts styrene were copolymerized with 1% benzoyl peroxide at 70° C. for 18 hours. The product was a firm, gel-like mass which was insoluble in the ordinary organic solvents. This is in marked contrast to the hard, rigid bodies of Example 1. Likewise, copolymers utilizing styrene tend to be of a gel-like nature and require more time for copolymerization product to reach a surface-hard condition. The styrene copolymers may even possess opacity. As an example of this, 20 parts of diallyl itaconate and 80 parts of styrene were heated with 0.5 parts benzoyl peroxide at 70° C. for 72 hours to obtain a hard, slightly opaque copolymer.

Example 7

The copolymerization process may be carried into effect using partially polymerized monomers as ingredients of the copolymers. By a partially polymerized monomer is meant a monomer or mixture of monomers which has been so subjected to polymerization influences that a substantial amount of unsaturation still remains. This unsaturation permits the formation of interpolymers. The symbol P designates a partial polymer of a single monomer and PP a partial polymer of a mixture of monomers.

| | Parts |
|---|---|
| P vinyl acetate | 50 |
| Diallyl itaconate | 50 | were mixed and treated with 1 part benzoyl peroxide at 70° C. for 12 hours, resulting in a hard, opaque copolymer resembling opal glass. Similar opaline copolymers are obtained by using P methyl methacrylate, P propyl methacrylate, P ethyl methacrylate, P butyl methacrylate, P methyl acrylate and P styrene.

The optical properties of these copolymers vary with different initial ratios of materials. For example, the interpolymerization of 90 parts P methyl methacrylate and 10 parts diallyl itaconate yields a hard, tough, clear copolymer. The interpolymerization of 60 parts P ethyl acrylate and 40 parts allyl itaconate likewise gives a clear copolymer.

Example 8

This exemplifies the production of interpolymers by copolymerizing diallyl itaconate with partially polymerized mixed monomers designated by PP. All mixtures were treated with 1% benzoyl peroxide at 70° C.

| Mixture | Copolymerization time in hours | Characteristics of copolymer |
|---|---|---|
| 43 parts diallyl itaconate<br>PP { 43 parts methyl methacrylate<br>14 parts ethyl acrylate | 48 | Hard, clear. |
| 33⅓ parts diallyl itaconate<br>PP { 33⅓ parts methyl methacrylate<br>33⅓ parts vinyl acetate | 48 | Hard, translucent. |
| 33⅓ parts diallyl itaconate<br>PP { 33⅓ parts styrene<br>33⅓ parts methyl methacrylate | 48 | Clear, firm gel. |
| 37 parts diallyl itaconate<br>PP { 26 parts ethyl acrylate<br>37 parts vinyl acetate | 48 | Hard, opaque. |
| 43 parts diallyl itaconate<br>{ 14 parts ethyl acrylate<br>43 parts styrene | 48 | Hard, clear. |
| 33⅓ parts diallyl itaconate<br>PP { 33⅓ parts vinyl acetate<br>33⅓ parts styrene | 48 | Soft, translucent. |
| 33⅓ parts diallyl itaconate<br>PP { 33⅓ parts methyl methacrylate<br>33⅓ parts vinyl acetate | 36 | Hard, translucent. |
| 33⅓ parts diallyl itaconate<br>PP { 33⅓ parts methyl methacrylate<br>33⅓ parts methyl itaconate | 36 | Do. |

Example 9

| | Parts |
|---|---|
| Diallyl itaconate | 20 |
| Ethylene glycol maleate (obtained by esterifying 54 parts maleic anhydride with 36 parts ethylene glycol) | 80 | when mixed with 0.1% benzoyl peroxide and heated at 50°–160° C., gave a clear, tough copolymer.

Example 10

| | Parts |
|---|---|
| Diallyl itaconate | 10 |
| Acetic-acid-modified ethylene glycol itaconate (obtained by interesterifying 130 parts itaconic acid, 66 parts ethylene glycol and 12 parts acetic anhydride) | 90 | when mixed with 0.1 part benzoyl peroxide and heated at 50°–130° C., gave an exceptionally hard, clear, insoluble, infusible copolymerization product.

EXAMPLE 11

| | Parts |
|---|---|
| Diallyl itaconate | 10 |
| Acetic-acid-modified ethylene glycol maleate (obtained by interesterifying 24.46 parts maleic anhydride, 17.7 parts ethylene glycol and 7.08 parts acetic anhydride) | 90 | when mixed with 0.1 part benzoyl peroxide and heated at 50°–130° C., gave an exceptionally hard, translucent, insoluble, infusible copolymerization product.

EXAMPLE 12

| | Parts |
|---|---|
| Diallyl itaconate | 15 |
| Polychlorinated biphenyls | 15 | were treated with 1% peroxide at 70° C. for 24 hours, resulting in a firm, translucent gel.

EXAMPLE 13

| | Parts |
|---|---|
| Diallyl itaconate | 7 |
| Styrene | 15 |
| Polychlorinated biphenyls | 15 | were treated at 70° C. for 24 hours with 1% benzoyl peroxide to give a clear, soft, gel. Higher amounts of diallyl itaconate, for example 15 parts, produce firmer gels with a tendency to become opaque. Similar results were obtained by using various ratios of diallyl itaconate, polychlorinated biphenyls and substances such as diisoamyl itaconate, methallyl methacrylate, diallyl maleate, methyl methacrylate, vinyl acetate, glycol dimethacrylate, etc., in place of the styrene.

EXAMPLE 14

| | Parts |
|---|---|
| Diallyl itaconate | 15 |
| Butyl alcohol | 15 | were treated with 1% peroxide at 70° C. for 24 hours, yielding a firm, translucent gel.

EXAMPLE 15

| | Parts |
|---|---|
| Diallyl itaconate | 15 |
| Ethylene glycol | 15 | were treated with 1% peroxide at 70° C. for 24 hours, giving a pasty, white gel.

EXAMPLE 16

| | Parts |
|---|---|
| Diallyl itaconate | 15 |
| Diethyl itaconate | 15 |
| Ethylene dichloride | 30 | were treated with 1% benzoyl peroxide at 70° C. for 24 hours, giving a clear gel.

EXAMPLE 17

| | Parts |
|---|---|
| Diallyl itaconate | 50 |
| Ethylene dichloride | 50 |
| Benzoyl peroxide | 0.5 | were heated for 24 to 72 hours at 70° C., giving a very firm gel. A very firm gel likewise was obtained when 50 parts benzene were used in place of ethylene dichloride.

EXAMPLE 18

Solution A:

| | Parts |
|---|---|
| Polymerized diamyl itaconate | 25 |
| U. S. P. petrolatum | 74 |
| Petroleum ether | 1 |

Solution B:

| | Parts |
|---|---|
| Monomeric methyl methacrylate | 4 |
| Diallyl itaconate | 6 |
| Benzoyl peroxide | 0.1 |

8 parts solution A and 2 parts solution B were heated at 70° C. for 24 hours, giving a white opaque gel.

EXAMPLE 19

| | Parts |
|---|---|
| Petrolatum | 8 |
| Diallyl itaconate | 1 |
| Diisoamyl itaconate | 1 |
| Methyl methacrylate | 0.5 |
| Benzoyl peroxide | 0.1 | were heated at 70° C. for 24 hours, giving a firm, opaque, white gel.

EXAMPLE 20

| | Parts |
|---|---|
| Diallyl itaconate | 2 |
| Diisoamyl itaconate | 4 |
| Petrolatum | 20 |
| Benzoyl peroxide | 0.26 | were heated at 70° C. for 24 hours, giving a soft, translucent gel.

EXAMPLE 21

| | Parts |
|---|---|
| Petrolatum | 8 |
| Diallyl itaconate | 4 |
| Benzoyl peroxide | 0.16 | were heated for 24 hours at 70° C., giving a very firm, translucent gel. When a temperature of 100° C. was used, a much firmer gel was obtained.

The itaconic esters herein described, as well as the interpolymers obtained by copolymerizing them with other polymerizable bodies, have a wide range of properties.

They vary from soft, flexible, soluble bodies to hard, rigid masses of varying resistance to solvents. In intermediate stages some form fluid compositions of varied intrinsic viscosity and may be so used or may be diluted with volatile or non-volatile solvents to viscosities best adapted to meet particular service applications. By suitable selection of the starting monomeric or partly polymerized materials, interpolymers can be obtained in an insoluble, infusible state practically resistant to the destructive effect of other chemical bodies such as acids, bases, solvents and the like.

The esters of this invention may be converted to polymers or interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic polymers and copolymers of this invention, with or without modifying agents, may be used in injection, compression or transfer molding processes to make numerous articles for industrial, household and novelty uses and other applications.

As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic saturated and unsaturated acids, esters of aromatic monobasic and polybasic acids, etc., may be incorporated into the polymers and copolymers of this invention to modify the same. Synthetic and natural resins, gums, oils, waxes, polyhalogenated aromatic derivatives, etc., likewise may be added as modifying agents.

In solvents, or without solvent utilizing a melt process, the fusible polymers may be used in adhesive and laminating applications to bond paper, wood, mica flakes, glass sheets, rubber sheets, etc., fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are polymerized alone, or copolymerized with another polymerizable monomer in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of polyhalogenated aromatic hydrocarbons, ethylene glycol, mineral oils including lubricating oils, etc.

What I claim as new and desire to secure by Letters Patent of the United States, is:

1. As a new product, a hard, clear interpolymer of, by weight, from 0.5 to 20 per cent diallyl itaconate and the remainder ethyl methacrylate, said interpolymer being heat-, solvent- and abrasion-resistant.

2. The method of producing new synthetic compositions which comprises forming a mixture of copolymerizable materials consisting of diallyl itaconate and ethyl methacrylate, said diallyl itaconate constituting from 0.5 to 20 per cent by weight of the said mixture, and heating the said mixture while admixed with a small amount of a polymerization catalyst until a solid copolymer of the said components has been formed.

3. A hard, clear water-white composition adapted to be molded, said composition being the product of polymerization of a mixture of, by weight, 0.5 part diallyl itaconate and 99.5 parts ethyl methacrylate.

4. The method of making a hard, clear, water-white composition adapted to be molded, said method comprising forming a mixture of, by weight, 0.5 part diallyl itaconate, 99.5 parts ethyl methacrylate and a small amount of benzoyl peroxide as a polymerization catalyst, and heating the resulting mixture at 55° C. for 27 hours, followed by heating at 85° C. for 24 hours.

GAETANO F. D'ALELIO.